June 26, 1923.

E. G. LOOMIS

1,459,782

MACHINE FOR MAKING HAIR WAVERS

Filed April 14, 1920　　6 Sheets-Sheet 1

June 26, 1923.

E. G. LOOMIS

1,459,782

MACHINE FOR MAKING HAIR WAVERS

Filed April 14, 1920

June 26, 1923.
E. G. LOOMIS
MACHINE FOR MAKING HAIR WAVERS
Filed April 14, 1920
1,459,782
6 Sheets-Sheet 6

Patented June 26, 1923.

1,459,782

UNITED STATES PATENT OFFICE.

EVARTS G. LOOMIS, OF NEWARK, NEW JERSEY, ASSIGNOR TO BRETT MANUFACTURING COMPANY, INC., OF NEW YORK, N. Y., A CORPORATION OF NEW YORK.

MACHINE FOR MAKING HAIR WAVERS.

Application filed April 14, 1920. Serial No. 373,743.

*To all whom it may concern:*

Be it known that I, EVARTS G. LOOMIS, a citizen of the United States, and resident of Newark, in the county of Essex and State of New Jersey, have invented certain new and useful Improvements in Machines for Making Hair Wavers, of which the following is a specification.

This invention relates to a machine for making hair-wavers, and more particularly the type of wavers disclosed in Letters Patent of the United States No. 1,139,398, dated May 11, 1915. Such patented wavers each comprise a body composed of a pliable metal core having a pliable non-metallic covering thereon, said body being doubled or looped upon itself and twisted to provide spiral ridges and intervening valleys, as fully described in said Letters Patent.

The principal object of my invention is the provision of a machine of simple and efficient construction and operation whereby hair-wavers of the character mentioned can be rapidly and economically produced in continuous succession from a roll of covered wire constituting the body material.

With this and other objects in view, my invention comprises various novel features of construction and combinations of parts which will be hereinafter fully described and claimed.

While I have herein shown and described in detail a preferred form of embodiment of my invention, it is to be understood that I do not limit myself to the particular mechanism disclosed, since the same may be modified in many respects within the principle of the invention and the scope of the appended claims.

Referring to the drawings, 20 designates a suitable supporting frame comprising a bed 21 and end standards 22, 23; and 24 designates a drive shaft extending longitudinally of the frame and having its bearings in the end standards.

In the present instance the shaft 24 bears a loose power-driven pulley 25 which is adapted to be rendered active or idle, as desired, through a suitable clutch connection. The clutch illustrated is of the pin and socket type, the spaced-apart pins 26 thereof being borne by a head 27 which is fast on the shaft, and the complementary sockets 28 for the pins being formed in the adjacent face of the pulley. The pulley hub is circumferentially grooved, as at 29, to receive the studs on the yoke arm of a clutch lever 30 which is fulcrumed on a bracket 31 projecting from the adjacent end standard 22. By properly moving the lever 30 the pulley can be clutched to or unclutched from the shaft as desired.

Between the outer arm of the lever and the adjacent end standard is a spring 32 which tends to maintain the pulley normally in idle or unclutched position. Projecting laterally from the lever, through a perforation in the standard, is a pin 320, the free end of which is enlarged to provide a shoulder 32′ that is positioned beneath and in close relation to a depending catch plate 33′ on a forwardly extending hand lever 33 fast on a rock-shaft 34 having its bearings in the end standards 22, 23, similarly to the shaft 24. The shoulder 32′ is so disposed that when the clutch lever 30 is actuated to clutch the wheel to the shaft, the shoulder lies beneath and is engaged by the depending lower portion of the catch 33′ of the hand lever 33, thereby latching the pin and maintaining the pulley in clutched position. The lever 33 thus constitutes a latch lever. When this latch lever is raised, either manually or automatically, to release the pin the spring 32 operates upon the lever 30 to shift the pulley to the unclutched or idle position. Means are provided for automatically tripping the latch lever, in the event of a kink or other protuberance on the wire material which is being delivered to the machine, or in the event of the wire being jammed in the machine, as will presently appear.

Secured in and between the end standards, in a plane above and parallel with the drive shaft, is a shaft 35 on which is loosely mounted a rotary structure, or "head," including a circumferentially grooved wheel element 36, the groove 37 of which is designed to receive, guide and support a strand of covered wire, as 38, drawn from a suitably disposed reel (not shown).

Figure 2:
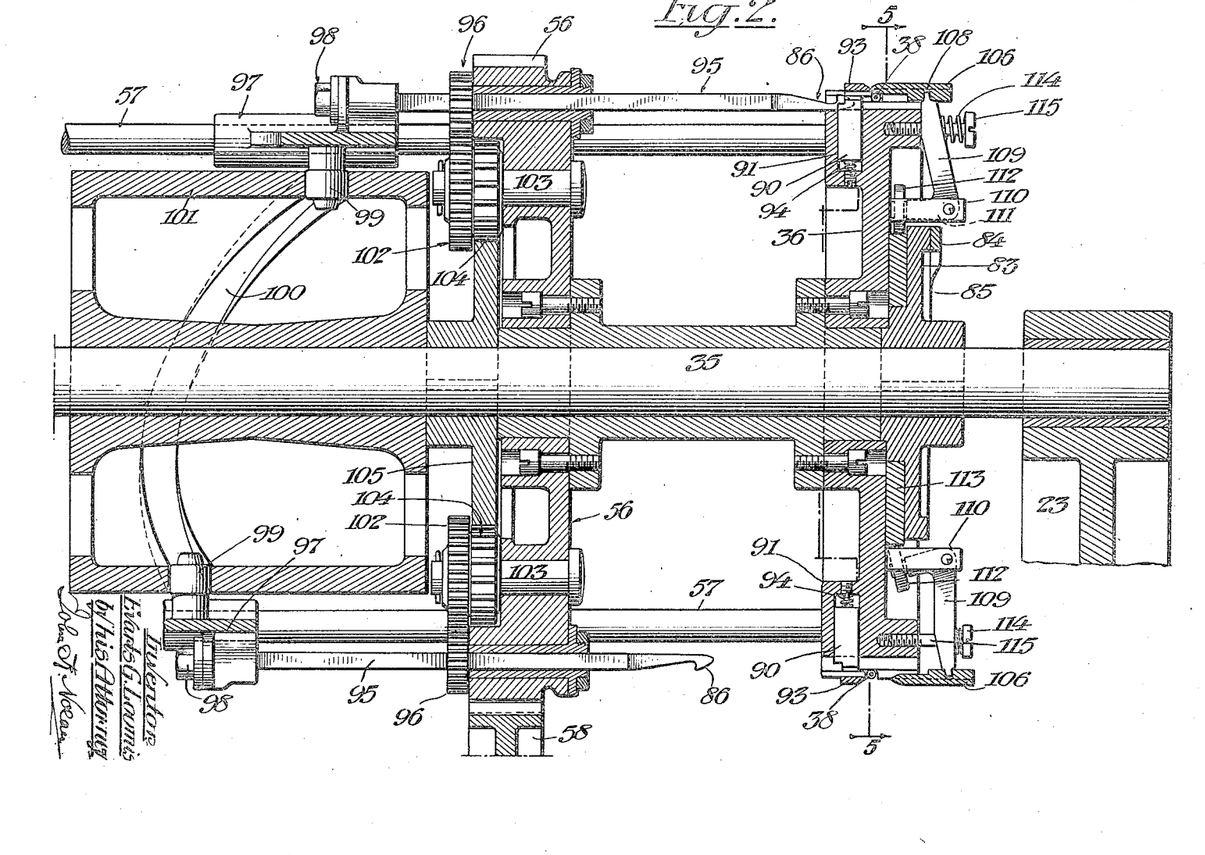
Fig. 2 is a partial longitudinal vertical section of the machine on the line 2—2 of Fig. 1.
Figure 3:
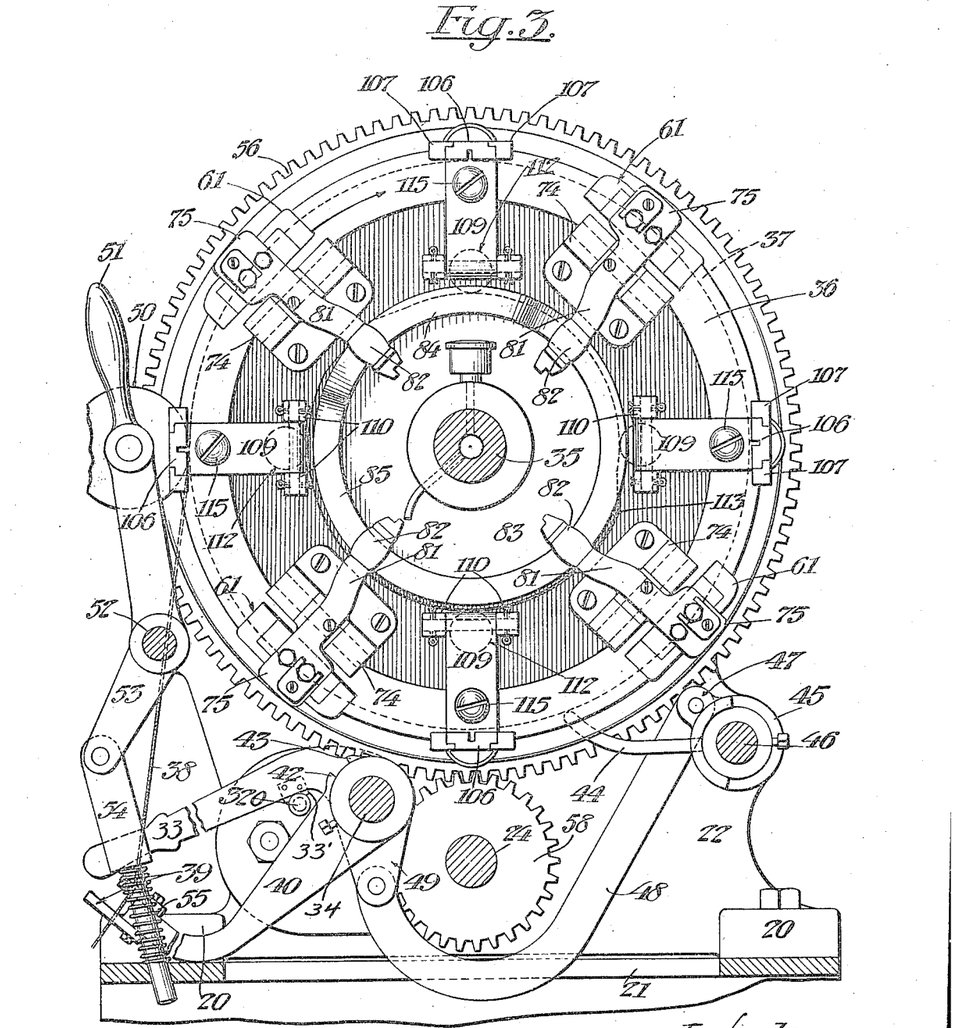
Fig. 3 is a transverse vertical section of the machine on the line 3—3 of Fig. 1.
Figure 4:
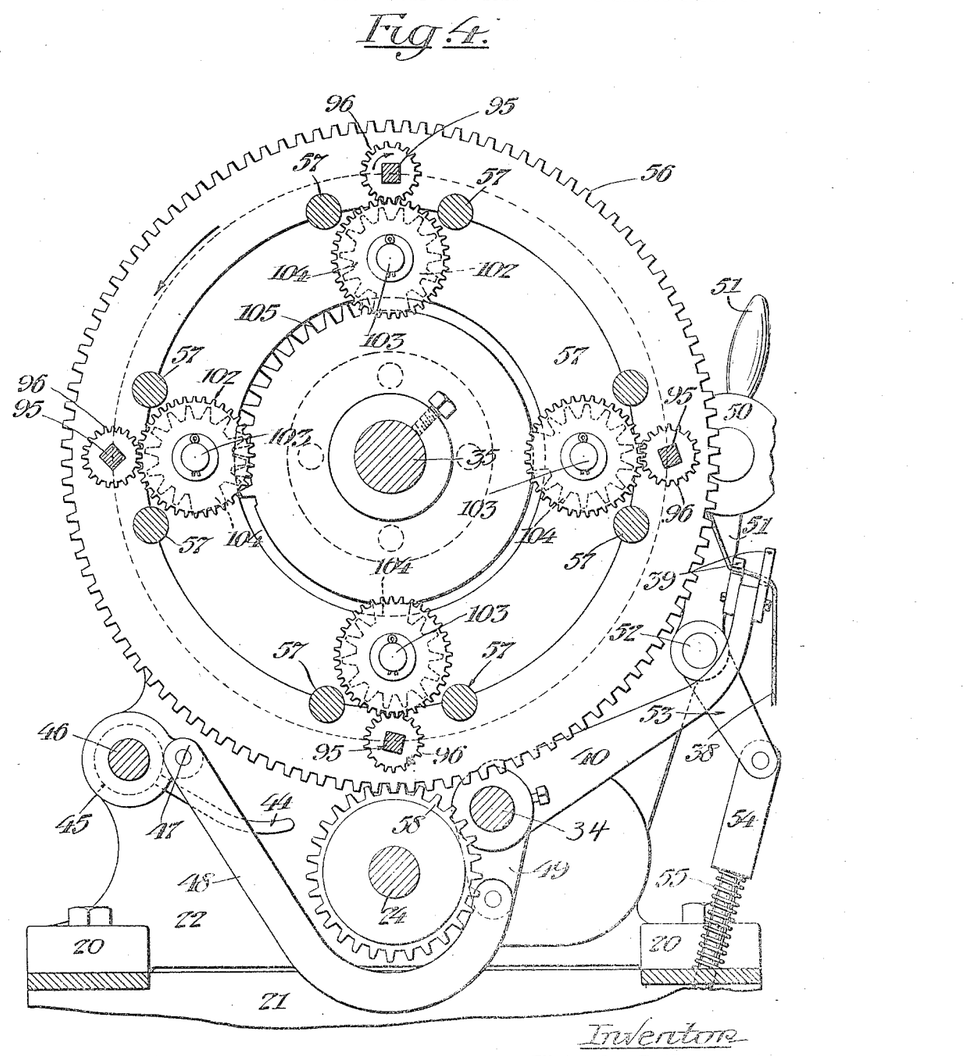
Fig. 4 is a similar section of the machine on the line 4—4 of Fig. 1, showing the machine as in idle position.
Figures 5, 6, 7, 8, 9:
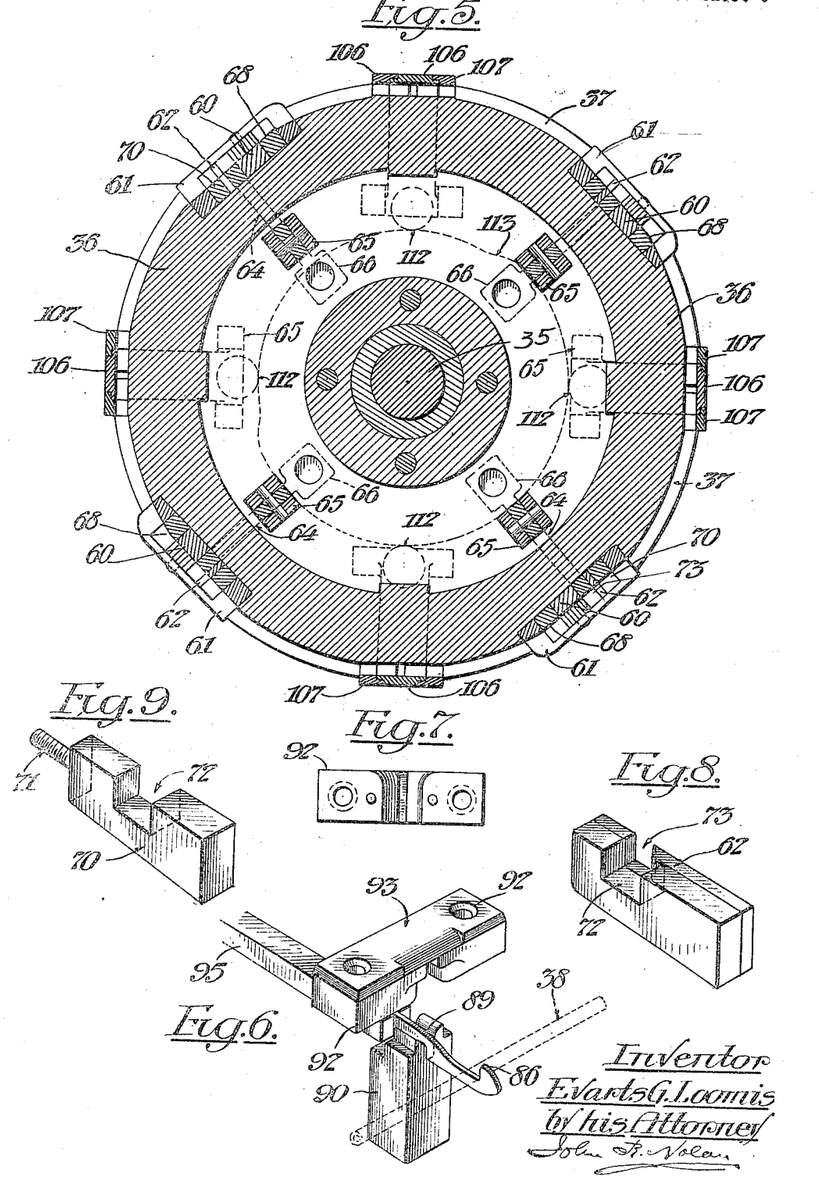
Fig. 5 is a transverse section through the rotary wire-supporting and feeding element, as on the line 5—5 of Fig. 2.
Fig. 6 is a skeleton perspective view of the respective members of a throat device on said element, showing the acting portion of a doubling and twisting hook as engaging a wire length preparatory to pulling it through the throat.
Fig. 7 is an inverted plan of the upper part of the throat device as detached.
Fig. 8 is a perspective view of one of the cutter knives and its supporting block.
Fig. 9 is a similar view of one of the adjusting wedge blocks for the clamp and cutter members.

In the present instance the wire passes to the wheel 36 through a guide comprising spaced eye plates 39 carried by the free end of a swinging arm 40 mounted on the rock-shaft 34 so as to have slight lost motion therein, that is, the hub of the arm is provided with a stop 42 which, when the arm is raised, contacts with a suitably disposed stop 43 on the rock-shaft and partially turns the latter. When the latch lever 33 is engaged with the clutch pin 320, and the machine is in operation, the guide arm is in the down position most clearly shown in Fig. 2, the wire passing freely to the groove of the wheel 36; but when a kink or other protuberance on the wire, engages the opposing guide plate, the arm 40 is forcibly raised, thus partially turning the rock-shaft 34 in such a manner as to unlatch the clutch pin 320, and effect the automatic unclutching of the pulley 25 from the drive shaft. (See Fig. 4.)

A trip-finger 44 is positioned below the rear of the wheel 36 so as to be movable into and from the circumferential groove of the latter. This finger extends from a suitably-disposed collar 45 loose on a shaft 46 which is secured in and between the end standards. On the collar is an upwardly projecting arm 47 which is connected by means of a link 48 with a depending arm 49 on the rock-shaft 41 in such a manner that when the latter is in active position, that is, when the machine is running, (as in Fig. 2), the tip of the finger is entered in the groove of the wheel 36 so as to lie in the path of any wire material that may happen to be jammed in the groove beyond the point of discharge therefrom of the hair-wavers fashioned from the wire. Such obstructive wire, if present, will impinge against the trip finger and swing it outwardly (as in Fig. 4), thus through the arm and link connections partially turning the rock-shaft 41 and disengaging the latch lever from the notch of the clutch pin. Consequently the machine will be automatically stopped to permit the removal of the defective wire material from the groove.

A pressure roller 50, which is arranged to bear upon the wire as it enters the groove of the wheel 36, acts to maintain the progressing wire under tension. This roller is rotatably mounted in the upstanding arm 51 of a hand-lever that is pivoted, as at 52, to the adjacent end standard 23. The depending arm 53 of the lever is pivoted to a spring-pressed toggle member 54 loosely fitted in an orifice in the bed. The spring 55 of the toggle when the lever arm 51 is manually swung forward tends to hold the roller in yielding contact with the wire within the groove, but when such arm is similarly swung outward the spring 55 tends to maintain the roller in outward position free of the wheel groove.

Figure 14:
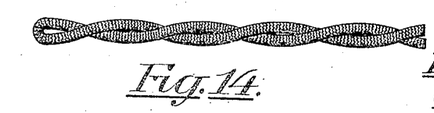
Fig. 14 represents one of the hair wavers which my machine is designed to produce.

The circumferentially grooved wheel is equipped with sets of wire clamping and cutting devices, (in the present instance four sets) which are so spaced apart and relatively arranged and operated that the wire delivered to and borne by the wheel is periodically clamped at equally spaced intervals and cut into uniform lengths during the rotation of the wheel, as will be hereinafter described. Each of the lengths thus cut constitutes the body of a hair-waver of the character illustrated in Fig. 14.

Figure 1:
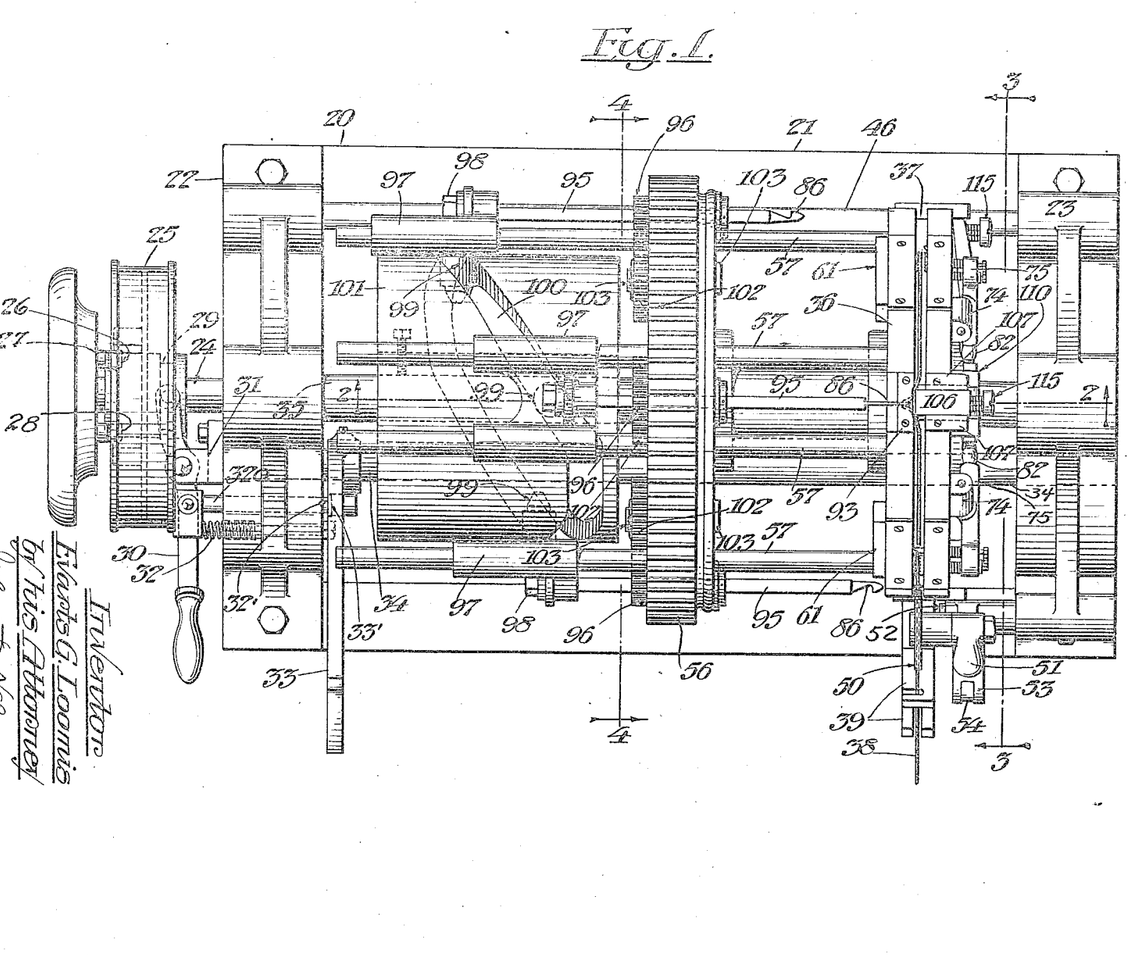
Figure 1 is a plan of a hair-waver making machine embodying my invention, the machine being shown as in operation.

The rotary structure includes a relatively large spur wheel 56 which is spaced a suitable distance from the inner (or left hand) side of the wheel 36 and is rigidly connected thereto by means of a series of pairs of rods 57 which are parallel to the stationary shaft 35. In the present instance there are four pairs of connecting rods in equal spaced relation to each other as shown, which rods are extended through and laterally beyond the spur wheel 56 so as to afford parallel guides for certain wire doubling and twisting instrumentalities which will presently be explained. (See Figs. 1 and 4.)

The spur wheel 56 meshes with an underlying pinion 58 fast on the drive shaft, and hence during the operation of said shaft the wheels 56 and 36, together with their appurtenances, are positively and continuously rotated.

Figures 10, 11, 12, 13:
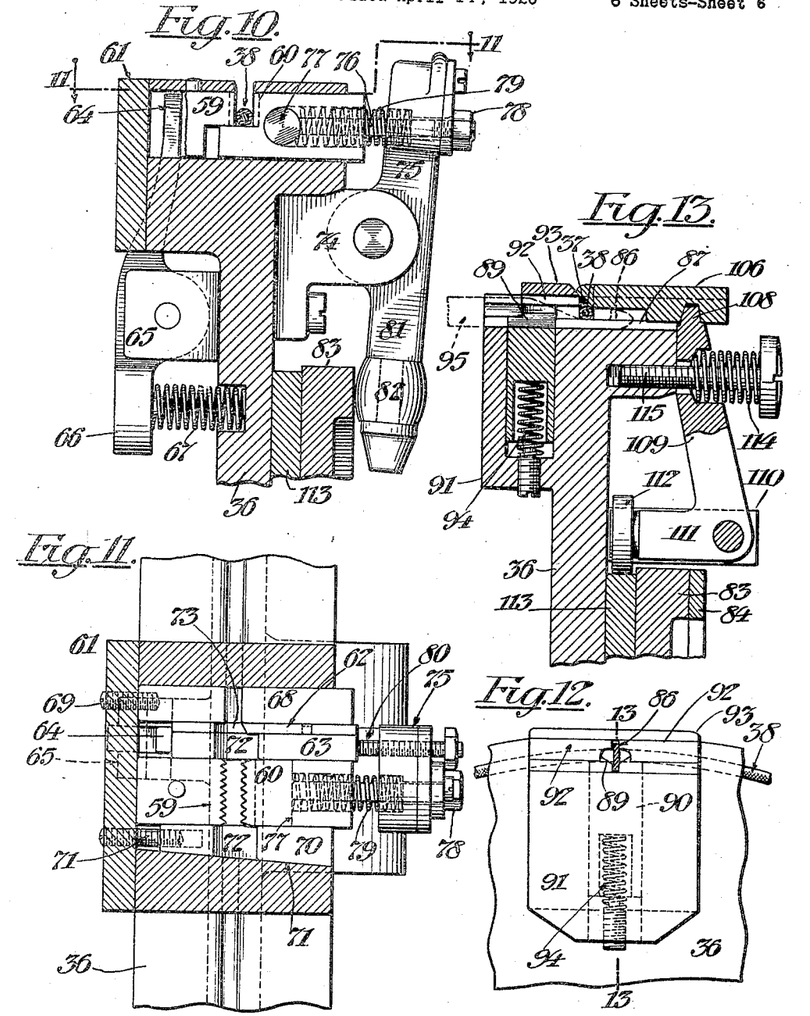
Fig. 10 is a vertical section through a portion of the rotary wire-supporting and feeding element, showing a wire clamp, and lever and cam mechanism for actuating said clamp and the adjacent cutter.
Fig. 11 is a transverse horizontal section on the line 11—11 of Fig. 10.
Fig. 12 is an elevation of a part of the wire-supporting and feeding element showing a throat device, and also a hook therein in section.
Fig. 13 is a vertical section on the line 13—13 of Fig. 12.

Each clamping device, in its preferred form, comprises a pair of complementary jaws 59, 60 mounted in a housing 61 on the periphery of the wheel 36 and disposed at the respective sides of the wire groove 37. The jaw 59 is fixed in the housing and the other, 60, is movable therein toward and from the fixed jaw, their opposing faces being preferably serrated as shown. (See Figs. 10 and 11.)

Each cutter associated with a clamping device comprises a knife blade 62 which is fixed to a block 63 slidably arranged within the housing and at one edge of the clamp jaws. This block, together with the knife, is held normally in retracted or idle position by the pressure against the block of the arm 64 of a lever which is fulcrumed between lugs 65 on the adjacent side of the wheel 36; the other arm 66 of the lever being held normally outward by means of a spring 67 interposed between the latter arm and the wheel. The knife 62 is in lateral contact with a guide block 68 which is secured to the housing by a screw, as 69, and the block 63 is in contact with the adjacent longitudinal sides of the jaws. Hence the correlated members provide guides for each other. The opposite sides of the jaws are supported by a block 70, which is interposed between the jaws and the adjacent wall of the housing, which block 70 and the contiguous wall are relatively inclined as shown at 71, Fig. 11, so that by longitudinal movement of the block 70 the jaws and cutter block can be nicely adjusted into close lateral relation to each other. Adjustment of the wedge block 70 can be readily effected by means of a set screw 71 extending from the wall of the housing into a tapped orifice in said block. In order to preserve the continuity of the circumferential groove of the wheel 36, the blocks and the body of the knife are appropriately recessed, as at 72, 73, respectively. (See Figs. 8, 9, 10 and 11.)

The leading end of the strand of wire, when it is entered in the circumferential groove of the wheel and held therein by the roller 50, is carried onward by the rotating wheel until the wire is flanked by a pair of complementary clamping jaws 59, 60, and is in close relation to the inner or cutting edge of the adjacent knife 62. Mechanism is provided whereby at a predetermined interval in the progress of the wheel the movable jaw of the clamp is actuated to clamp, and the knife is actuated to sever, the wire.

The preferred mechanism for timely actuating the clamp jaw and the cutter comprises a lever which is fulcrumed on a bracket 74 suitably disposed on the outer face of the wheel. One arm, 75, of the lever is yieldingly connected with the movable jaw, such connection, in the present instance, comprising a rod 76 which is pivotally secured to the jaw, as at 77, extended outwardly through an orifice in the lever arm, and equipped at its free end with an adjusting nut 78; a spring 79 being interposed between the jaw and the lever arm. This arm also bears, laterally of the spring, a set screw 80 which lies in close relation to the outer end of the knife block 63. The other arm 81 of the lever extends radially inward and bears a roll 82 which is held, by the action of the spring-pressed knife block, in contact with a cam 83 fast on the stationary shaft 35. (See Figs. 2, 10 and 11.)

The contour of the cam 83 is such that after each succeeding roll 82 passes the point of delivery of the wire to the groove of the wheel 36, such roll rides upon a raised segmental portion 84 of the cam and is thereby swung outward and maintained in that position for a certain interval of time. It then engages and rides upon the remaining lower segmental portion 85 of the cam. When the roll rides upon the raised portion of the cam the arm 75 of the lever is swung inward, and hence the associated movable clamp jaw is pressed yieldingly inward in a manner to grasp the opposing wire, and the knife block is positively moved against the action of the spring-pressed lever and of the spring 79 in order to sever the wire in advance of and adjacent the clamp. When the clamped end of the strand has been carried a distance equal to the length of a hairwaver body, the next succeeding clamp on the wheel grasps the wire, and the cutter associated with the latter clamp is actuated to sever the wire. At the same time the roll on the actuating lever for the leading clamp and cutter rides upon the lower portion of the cam 83. Thereupon the leading clamp and cutter resume their normal or idle position. While the severed length thus positioned on the top of the wheel is released at its respective ends, the leading end of the strand is held by the adjacent clamp in order that it shall be advanced with the rotating wheel similarly to the immediately preceding portion of the wire. (See Fig. 1.) The sets of clamps and cutters are actuated in successive order as above described during the rotation of the wheel, and hence the strand is progressively advanced and severed at succeeding intervals into proper lengths for the bodies of hair-wavers.

As each wire length is severed from the strand and released such length is engaged midway between its ends by one of a series of doubling and twisting hooks 86, which will be hereinafter described.

The periphery of the wheel 36 is provided midway between succeeding cutters with transverse channels 87 which underlie the wire groove 37 and are each adapted to receive a doubling and twisting hook 86, preparatory to the engagement of the latter with a wire length. The end of the channel, at the inner side of the wheel, communicates with a throat through which the wire length is forcibly drawn laterally and thus doubled upon itself, and at the same time longitudinally twisted, by and during the retraction of the hook. The lower part of the throat is constituted by a laterally flared groove 89 formed in the upper end of a block 90 which is supported for slight radial movement in a projection 91 on the inner side of the wheel, and the upper part of the throat is constituted by a pair of plates 92 connected by a cap-plate 93 and secured to the wheel. The inner edges of the plates 92 are suitably grooved and spaced apart to form the upper portion of the throat. The block 90 is pressed yieldingly outward by a confined spring 94 within the projection 91 so as to afford limited resiliency of the throat in order to accommodate the variable size of the looped portion of the wire as it is being withdrawn through the throat and being doubled and twisted by the hook. (See Figs. 2, 6, 7, 12 and 13.)

The doubling and twisting hooks, of which there are four in the present instance, are provided with polygonal shanks 95 which slidably extend through correspondingly formed central orifices in the hubs of a series of equally spaced pinions 96 which are mounted to rotate independently of each other in the spur wheel 56. The outer end of each shank is provided with a threaded portion which is extended through a perforated lug on a guide piece 97 and secured in place by means of a nut 98. This guide piece is slidably fitted on the tail portions of the adjacent pair of rods 57. The guide piece bears a roll 99 which runs in the race 100 of a barrel cam 101 fast on the stationary shaft 35, which race is so formed and timed that during the rotation of the spur wheel and the hook shank about the axis of said shaft, the shank is gradually reciprocated longitudinally. The hook on said shank in its outward travel progressively draws out through the proximate throat the engaged wire length, thus doubling such length upon itself, which hook, in its inward movement, returns to and enters the throat for engagement with a succeeding wire length contained in the groove of the wheel.

During the outer stroke of each hook it is independently rotated on its longitudinal axis so as to impart the requisite twist to the doubled wire. The preferred means for thus independently rotating the hook at the proper interval of time, comprises a form of planetary gearing, including the pinion 96 through which the shank of the hook extends, which pinion meshes with a gear wheel 102 loose on a stud 103 extending from the spur wheel 56. On this stud is also mounted to turn with the pinion 96, the driven member 104 of a Geneva stop motion, the co-operating drive member 105 whereof is fast on the stationary shaft 35. The teeth and the plane peripheral locking surfaces of the respective Geneva members are so relatively formed and disposed that the independent rotation of the succeeding hooks is permitted during their outward movement only, said hooks by the co-acting plane surfaces of the respective co-acting members being locked against independent rotation during the inward movement of the hooks. (See Figs. 2 and 4.)

Preferably the race 100 of the cam 101 is so formed and positioned that a hook is caused to move toward the peripheral portion of the wheel 36 at the front of the machine in a manner gradually to approach and enter an opposing channel 87 of the wheel in advance of the entrance of the strand of wire to the circumferential groove. The hook remains in the channel until a waver length has been severed, and is then gradually drawn outward and independently rotated concurrently with the rotation of the wheel until the hook again reaches the front of the machine for a succeeding action. When the hook is positioned at the top of the wheel and seated within its channel, the nose of the hook projects upward so as to engage the opposing wire, but when the hook reaches its position at the rear of the machine and the hook is fully retracted from the channel, the nose of the hook projects downward so as to permit the finished hair-waver to drop therefrom.

The trip-finger 44 above referred to enters the circumferential groove of the wheel 36 just in advance of the point of discharge of the waver, so that should a defective waver become jammed and remain in the groove, the obstruction will forcibly impinge against the trip-finger and swing it outward in a manner to effect the automatic stopping of the machine as previously described.

In order to ensure the positive engagement of the succeeding severed lengths of wire with the respective underlying hooks, I preferably provide a series of suitably-disposed pressure devices which are adapted to bear at proper intervals of time upon the succeeding lengths.

In the present instance there are four pressure devices mounted on the periphery of the wheel in alternation with the sets of clamps and cutters. Each pressure device, in its preferred construction, comprises a bevel nosed slide 106 fitted in transverse guides 107 on the periphery of the wheel 36, so as to be movable across the wire guide of the latter and upon the contained wire. The outer portion of the slide is connected, as by a tongue and socket 108, to the upstanding arm 109 of a bell-crank lever which is pivoted in and between a pair of outwardly projecting bracket arms 110 on the outer side of the wheel 36. The other arm 111 of the lever bears a roll 112 which, during the rotation of the wheel 36, rides on a cam 113 which is fast on the stationary shaft 35 laterally adjacent the cam 83. Normally the upper lever arm 109 is pressed inward and the roll 112 thereof is held in operative contact with the cam 113 by means of a suitably-disposed spring 114. In the present instance the spring is interposed between the arm 111 and the head of a screw 115 which extends laterally from the wheel and through an aperture in the arm 111. The peripheral contour of the cam 113 is such that in a proper part of the rotation of the wheel 36 the cam moves the crank lever against the action of the spring 114 in order to retract the slide 106, and then releases the arm to permit the slide to return to its inward position and remain therein for a proper interval of time. When the slide is moved inward by the pressure of the spring 114 the beveled nose of the slide bears against the severed length of wire within the peripheral groove of the wheel 38 and thus presses down the body of the wire length at a point intermediate its ends and ensures its positive engagement with the hook. (See Figs. 2, 5 and 13.)

From the foregoing it will be seen that the rotary structure, including the wire supporting and feeding wheel 36 and the series of wire doubling and twisting hooks, are continuously rotated as a unit; that the wire is delivered to and progressively carried about the periphery of the rotating wheel; that said wire in its progress is clamped at succeeding intervals upon the wheel and severed into lengths suitable for the bodies of hair-wavers; that the said hooks gradually approach the rotating wheel and enter the grooves thereof in position to engage the succeeding wire lengths when the latter are severed from the strand; that said hooks thereafter recede from the wheel in a manner to draw the lengths through the peripheral throat portions of the wheel and double or fold the lengths upon themselves; that during such outward movement of the hooks they are independently rotated in a manner to twist the doubled lengths, and that when the wheel has progressed a predetermined distance are doubled and twisted wire lengths are completed and discharged. Thus a machine embodying the principles of my invention produces in a rapid and economical manner from a covered-wire drawn from a reel, a succession of hair-weavers of uniform length, form and appearance.

I claim—

1. In a machine for making hair wavers, the combination with a movable element adapted to support and progressively advance a strand of wire, of sets of complementary clamps and cutters arranged in spaced relation to each other and in proximity to the path of the wire, means for progressively actuating said clamps and cutters during the travel of the wire, whereby the wire is clamped and cut at intervals to produce predetermined lengths, and mechanism, including rotary and longitudinally movable wire engaging devices, whereby each succeeding wire length is doubled upon itself and longitudinally twisted.

2. In a machine for making hair wavers, the combination with a movable element adapted to support and progressively advance a strand of wire, of sets of complementary clamps and cutters arranged in spaced relation to each other and in proximity to the path of the wire, means for progressively actuating said clamps and cutters during the travel of the wire, whereby the wire is clamped and cut at intervals to produce predetermined lengths, the succeeding sets of clamps being so spaced apart and their actuating mechanism being so timed that as each length is cut from the strand the leading end of the strand is held by a clamp, and mechanism, including rotary and longitudinally movable wire engaging devices, whereby each succeeding wire length is doubled upon itself and longitudinally twisted.

3. In a machine for making hair wavers, the combination with a movable element adapted to support and progressively advance a strand of wire, of sets of complementary clamps and cutters arranged in spaced relation to each other and in proximity to the path of the wire, each of said clamps including an independently movable member and each of said cutters including an independently movable member adjacent said jaw, means for progressively actuating the respective movable clamp members and movable cutter members during the travel of the wire, whereby said wire is clamped and cut at intervals to produce predetermined lengths, and mechanism, including rotary and longitudinally movable wire engaging devices, whereby each succeeding wire length is doubled upon itself and longitudinally twisted.

4. In a machine for making hair wavers, the combination with a movable element adapted to support and progressively advance a strand of wire, of sets of complementary clamps and cutters arranged in spaced relation to each other and in proximity to the path of the wire, each of said clamps including an independently movable member and each of said cutters including an independently movable member adjacent said jaw, mechanism for yieldingly actuating the respective movable clamp members and for positively actuating the respective movable cutter members during the travel of the wire, whereby the wire is clamped and cut at intervals to produce predetermined lengths, and mechanism, including rotary and longitudinally movable wire engaging devices, whereby each succeeding wire length is doubled upon itself and longitudinally twisted.

5. In a machine for making hair wavers, the combination with a movable element adapted to support and progressively advance a strand of wire, of sets of complementary clamps and cutters arranged in spaced relation to each other and in proximity to the path of the wire, each of said clamps including an independently movable member and each of said cutters including an independently movable member adjacent said jaw, mechanism for yieldingly actuating the respective movable clamp members and for positively actuating the respective movable cutter members during the travel of the wire, whereby the wire is clamped and cut at intervals to produce predetermined lengths, the succeeding sets of clamps being so spaced apart and their actuating mechanism being so timed that as each length is cut from the strand the leading end of the strand is held by a clamp, and mechanism, including rotary and longitudinally movable wire engaging devices, whereby each succeeding wire length is doubled upon itself and longitudinally twisted.

6. In a machine for making hair wavers, the combination with a rotatable element having a peripheral wire supporting and guiding portion, of sets of complementary clamps and cutters mounted on said element in spaced relation to each other and in proximity to said supporting and guiding portion, each of said clamps including an independently movable member and each of said cutters including an independently movable member adjacent said jaw, means for progressively actuating the respective movable clamp members and movable cutter members during the rotation of said element, whereby a wire carried by said element is clamped and cut at intervals to produce predetermined lengths, the succeeding sets of clamps and cutters being so spaced apart and their actuating mechanism being so timed that as each succeeding length is cut from the strand the leading end of the strand is held by a clamp and the other end is unclamped, and mechanism, including rotary and longitudinally movable wire engaging devices, whereby each succeeding wire length is doubled upon itself and longitudinally twisted.

7. In a machine for making hair wavers, the combination with mechanism for producing and advancing succeeding lengths of wire, of mechanism, including a rotary member, a doubling and twisting hook slidably mounted thereon, means for reciprocating said hook toward and from each succeeding wire length, and means for rotating said member and hook during the retraction of the hook, whereby each succeeding wire length is engaged by the hook and is doubled upon itself and longitudinally twisted.

8. In a machine for making hair wavers, the combination with a rotary element and mechanism thereon for producing a succession of lengths of wire, of a series of spaced apart doubling and twisting members, means for bodily rotating the series of members correspondingly with the rotary element, means for moving said members toward and from the succeeding lengths of wire on said element, and means for independently rotating said members during their retraction from said element.

9. In a machine for making hair wavers, the combination with a rotatable element having a peripheral wire supporting and guiding portion, of sets of complementary clamps and cutters mounted on said element in spaced relation to each other and in proximity to said supporting and guiding portion, means for progressively actuating said clamps and cutters during the rotation of said element, whereby a wire carried by said element is carried by said element is clamped and cut at intervals to produce predetermined lengths, and doubling and twisting mechanism whereby the succeeding wire lengths thus produced are engaged and withdrawn from said element.

10. In a machine for making hair wavers, the combination with a rotatable element having a peripheral wire supporting and guiding portion and spaced apart throat portions extending laterally from said guiding portion, of sets of complementary clamps and cutters mounted on said element in spaced relation to each other and to said throat portions and in proximity to said supporting and guiding portion, each of said clamps including an independently movable member and each of said cutters including an independently movable member adjacent said jaw, means for progressively actuating the respective movable clamp members and movable cutter members during the rotation of said element, whereby a wire carried by said element is clamped and cut at intervals to produce predetermined lengths, the succeeding sets of clamps and cutters being so spaced apart and their actuating mechanism being so timed that as each succeeding length is cut from the strand the leading end of the strand is held by a clamp, and mechanism, including rotary engaging devices movable longitudinally into and from said throat portions, whereby each succeeding wire length is withdrawn from said element, doubled upon itself and longitudinally twisted.

11. In a machine for making hair wavers, the combination with a rotatable element having a peripheral wire supporting and guiding portion, and spaced apart throat portions extending laterally from said guiding portion, of sets of complementary clamps and cutters mounted on said element in spaced relation to each other and to said throat portions and in proximity to said supporting and guiding portion, means for progressively actuating the respective clamps and cutters during the rotation of said element, whereby a wire carried by said element is clamped and cut at intervals to produce predetermined lengths, and mechanism, including rotary wire engaging devices movable longitudinally into and from said throat portions, whereby each succeeding wire length is withdrawn from said element, doubled upon itself and longitudinally twisted.

12. In a machine for making hair wavers, the combination with a rotatable element having a peripheral wire supporting and guiding portion, and spaced apart throat portions extending laterally from said guiding portion, of sets of complementary clamps and cutters mounted on said element in spaced relation to each other and to said throat portions and in proximity to said supporting and guiding portion, means for progressively actuating the respective clamps and cutters during the rotation of said element, whereby a wire carried by said element is clamped and cut at intervals to produce predetermined lengths, the succeeding sets of clamps and cutters being so spaced apart and their actuating mechanism being so timed that as each length is cut from the strand the leading end of the strand is held by a clamp and the other end is unclamped, and mechanism, including rotary wire engaging devices movable longitudinally into and from said throat portions, whereby each succeeding length is withdrawn from said element, doubled upon itself and longitudinally twisted.

13. In a machine for making hair wavers, the combination with a rotatable element having a peripheral wire supporting and guiding portion, and spaced apart throat portions extending laterally from said guiding portion, of sets of complementary clamps and cutters mounted on said element in spaced relation to each other and to said throat portions and in proximity to said supporting and guiding portion, each of said clamps including an independently movable member and each of said cutters including an independently movable member adjacent said jaw, and mechanism for progressively actuating the respective sets of clamps and cutters during the rotation of said element, said mechanism including yielding connections for actuating the respective movable jaw members and positive connections for actuating the respective movable cutter members, and mechanism, including rotary wire engaging devices movable longitudinally into and from said throat portions, whereby each succeeding wire length is withdrawn from said element, doubled upon itself and twisted.

14. In a machine for making hair wavers, the combination with a movable element adapted to support and progressively advance a strand of wire, of sets of complementary clamps and cutters arranged in spaced relation to each other and in proximity to the path of the wire, means for progressively actuating said clamps and cutters during the travel of the wire, whereby the wire is clamped and cut at intervals to produce predetermined lengths, pressure mechanism alternating with the clamps for bearing upon an intermediate part of the wire lengths, and mechanism, including rotary and longitudinally movable wire engaging devices, whereby each succeeding wire length is grasped at its intermediate portion, then doubled upon itself and longitudinally twisted.

15. In a machine for making hair wavers, the combination with a rotatable element having a peripheral wire supporting and guiding portion and spaced apart throat portions extending laterally from said guiding portion, of sets of complementary clamps and cutters mounted on said element in spaced relation to each other and to said throat portions and in proximity to said supporting and guiding portion, means for progressively actuating the respective clamps and cutters during the rotation of said element, whereby a wire carried by said element is clamped and cut at intervals to produce predetermined lengths, mechanism, including presser members adjacent the respective throats, for bearing upon the opposing intermediate portion of the wire lengths during the rotation of said element, and mechanism, including rotary and longitudinally movable wire engaging devices whereby each succeeding wire length is grasped at its intermediate portion, then doubled upon itself and twisted.

Signed at Newark, in the county of Essex and State of New Jersey, this 7th day of April, A. D. 1920.

EVARTS G. LOOMIS.